US011845810B2

(12) United States Patent
Courtemanche et al.

(10) Patent No.: US 11,845,810 B2
(45) Date of Patent: Dec. 19, 2023

(54) SILICON GLYCAN AND METHOD OF PREPARING SAME

(71) Applicants: Dow Silicones Corporation, Midland, MI (US); Dow Global Technologies LLC, Midland, MI (US)

(72) Inventors: Marc-Andre Courtemanche, Midland, MI (US); Michael Salvatore Ferritto, Midland, MI (US); Emmett Partain, Midland, MI (US); Wendy Xu, Midland, MI (US)

(73) Assignees: DOW SILICONES CORPORATION, Midland, MI (US); DOW GLOBAL TECHNOLOGIES LLC, Midland, MI (US)

( * ) Notice: Subject to any disclaimer, the term of this patent is extended or adjusted under 35 U.S.C. 154(b) by 277 days.

(21) Appl. No.: 17/418,965

(22) PCT Filed: Dec. 26, 2019

(86) PCT No.: PCT/US2019/068556
§ 371 (c)(1),
(2) Date: Jun. 28, 2021

(87) PCT Pub. No.: WO2020/142344
PCT Pub. Date: Jul. 9, 2020

(65) Prior Publication Data
US 2022/0112310 A1  Apr. 14, 2022

Related U.S. Application Data

(60) Provisional application No. 62/786,648, filed on Dec. 31, 2018.

(51) Int. Cl.
C08B 11/20 (2006.01)
C08B 11/145 (2006.01)

(52) U.S. Cl.
CPC ............ *C08B 11/20* (2013.01); *C08B 11/145* (2013.01)

(58) Field of Classification Search
CPC .............................. C08B 11/20; C08B 11/145
See application file for complete search history.

(56) References Cited

U.S. PATENT DOCUMENTS

| 4,973,680 | A | 11/1990 | Billmers |
| 4,992,538 | A | 2/1991 | Sau |
| 5,059,686 | A | 10/1991 | Sau |
| 5,071,978 | A | 12/1991 | Sau |
| 5,583,244 | A | 12/1996 | Uchida et al. |
| 6,066,727 | A | 5/2000 | Yamamoto et al. |
| 7,199,205 | B2 | 4/2007 | Okawa et al. |
| 8,518,387 | B2 | 8/2013 | Drovetskaya et al. |
| 8,853,372 | B2 | 10/2014 | Beck et al. |
| 8,877,216 | B2 | 11/2014 | Joffre et al. |
| 9,023,830 | B2 | 5/2015 | Kamei |
| 9,192,564 | B2 | 11/2015 | Delvalle et al. |
| 9,315,631 | B2 | 4/2016 | Joffre et al. |
| 2001/0021387 | A1 | 9/2001 | Krammer et al. |
| 2004/0176534 | A1 | 9/2004 | Rogers et al. |
| 2006/0041117 | A1 | 2/2006 | Engelhardt et al. |
| 2008/0209645 | A1 | 9/2008 | Carrillo et al. |
| 2009/0281303 | A1 | 11/2009 | Massonne et al. |
| 2011/0218336 | A1 | 9/2011 | Kohno et al. |
| 2013/0130949 | A1 | 5/2013 | Partain, III et al. |
| 2018/0078486 | A1 | 3/2018 | Kadlec et al. |
| 2018/0133144 | A1 | 5/2018 | Konishi et al. |

FOREIGN PATENT DOCUMENTS

| CN | 101027324 A | 8/2007 |
| CN | 107666899 A | 2/2018 |
| EP | 0385396 A1 | 9/1990 |
| EP | 0770660 A1 | 5/1997 |
| EP | 1132407 B1 | 9/2001 |

(Continued)

OTHER PUBLICATIONS

Wagner et al.("Silicon-Modified Carbohydrate Surfactants VIII. Equilibrium Wetting of Perfluorinated Solid Surfaces by Solutions of Surfactants Above and Below the Critical Micelle Concentration-Surfactant Distribution . . . interfaces", Applied Organometallic Chemistry, vol. 13, pp. 21-28 (1999)) (Year: 1999).*
Wagner et al.("Silicon-Modified Carbohydrate Surfactants VII. Impact of Different Silicon substructures on the Wetting Behaviour of Carbohydrate Surfactants on Low-Energy Surfaces—Distance Decay of Donor—Acceptor Forces", Applied Organometallic Chemistry, vol. 12, pp. 265-276 (1998)). (Year: 1998).*
Machine assisted English translation of WO2010037986A1 obtained from https://patents.google.com/patent on Jun. 28, 2022, 10 pages.
Xu, Hongrui, "Preparation of hybrid monolithic silica column by one-pot method for the open-loop reaction of amino and epoxy", Wanfang Database (p. 1-4), pp. 35-38; with machine assisted English translation, obtained from https://translate.google.com/ on Mar. 14, 2023.

(Continued)

*Primary Examiner* — Shaojia A Jiang
*Assistant Examiner* — Everett White
(74) *Attorney, Agent, or Firm* — WARNER NORCROSS + JUDD LLP

(57) ABSTRACT

A silicon glycan is provided. The silicon glycan comprises a glycoside moiety, independently selected organosilicon moieties, and beta-amino alcohol moieties joining the organosilicon moieties to the glycoside moiety. The glycoside moiety comprises independently selected saccharide moieties, which may be substituted with hydrocarbyl groups, ether moieties, and/or amine moieties. A method of preparing the silicon glycan is also provided. The method includes reacting (A) an aminoethyl polysaccharide and (B) an epoxide-functional organosilicon compound, to give the silicon glycan. The method may include preparing the aminoethyl polysaccharide (A) by first reacting (A1) a hydroxyl-functional polysaccharide and (A2) an aziridinium halide compound to give the aminoethyl polysaccharide (A).

18 Claims, No Drawings

(56) References Cited

FOREIGN PATENT DOCUMENTS

| WO | 0060023 A2 | 10/2000 |
| WO | 2003042284 A1 | 5/2003 |
| WO | 2006018323 A1 | 2/2006 |
| WO | 2010037986 A1 | 4/2010 |
| WO | 2010075912 A2 | 7/2010 |
| WO | 2010075913 A2 | 7/2010 |
| WO | 2013109523 A1 | 7/2013 |
| WO | 2016073004 A1 | 5/2016 |
| WO | 2016199644 A1 | 12/2016 |

OTHER PUBLICATIONS

Yudong, Huang et al., "Polyparaphenylene benzobisoxazole fiber", High Performance Fiber Technology Series, National Defense Industry, Foreward and pp. 159 and 160; Oct. 2016; with machine assisted English translation, obtained from https://translate.google.com/ on Mar. 14, 2023.
Machine assisted English translation of CN104357031A, obtained from https://patents.google.com on Sep. 28, 2021, 9 pages.
Machine assisted English translation of WO2010075912A2, obtained from https://patents.google.com on Sep. 28, 2021, 7 pages.
Machine assisted English translation of WO2010075913A2, obtained from https://patents.google.com on Sep. 28, 2021, 9 pages.
Partain, Emmett M. "The Synthesis of Hydrophobe-Modified Hydroxyethyl Cellulose Polymers Using Phase Transfer Catalysis" Polymer Modification. Springer, Boston, MA, 1997, pp. 31-43.
Zoppi, R. A., and Gonçalves, M. C. "Hybrids of Cellulose Acetate and Sol-Gel Silica: Morphology, Thermomechanical Properties, Water Permeability, and Biodegradation Evaluation." Journal of Applied Polymer Science, 2002, pp. 2196-2205. vol. 84.

* cited by examiner

SILICON GLYCAN AND METHOD OF PREPARING SAME

CROSS-REFERENCE TO RELATED APPLICATIONS

This application is the U.S. National Stage of International Application No. PCT/US2019/068556 filed on 26 Dec. 2019, which claims priority to and all advantages of U.S. Provisional Patent Application No. 62/786,648 filed on 31 Dec. 2018, the content of which is incorporated herein by reference.

FIELD OF THE INVENTION

The present invention generally relates to functional polymers and, more specifically, to a silicon glycan and methods of preparing the same.

DESCRIPTION OF THE RELATED ART

Compounds that exhibit rheology-modifying properties are employed in various industrial compositions, such as in drilling fluids. Silicone polymers and saccharide-based polymers (e.g. cellulose ethers) are two classes of such compounds. Silicone polymers and cellulose ethers are non-toxic compounds that are extensively used in industrial compositions, yet possess comparatively antagonistic properties with respect to one another. Silicone polymers are synthetically prepared, and are typically flexible, elastic, and non-polar. Silicone polymers generally exhibit high spreading and wetting behaviors associated with low surface tension and low surface energy. Cellulose ethers, for comparative example, are typically rigid, hydrophilic water-soluble polymers derived from natural sources, and are frequently utilized as rheology modifiers.

BRIEF SUMMARY

A silicon glycan is provided. The silicon glycan has the formula:

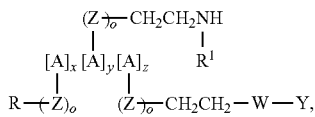

where each A is an independently selected saccharide moiety; each W is an independently selected beta-amino alcohol moiety; each Y is an independently selected organosilicon moiety; each R is independently selected from substituted or unsubstituted hydrocarbyl groups, ether moieties, amine moieties, and H; each $R^1$ is independently selected from substituted or unsubstituted hydrocarbyl groups and H; each Z is an independently selected ether moiety; each subscript o is independently 0 or 1; subscripts x and y are each independently from ≤0 to <1; subscript z is from >0 to 1, with the proviso that x+y+z=1; and moieties indicated by subscripts x, y, and z may be in randomized or block form in the silicon glycan.

A method preparing the silicon glycan is also disclosed. The method comprises reacting (A) an aminoethyl polysaccharide and (B) an epoxide-functional organosilicon compound, to give the silicon glycan.

DETAILED DESCRIPTION OF THE INVENTION

A silicon glycan has the general formula (I):

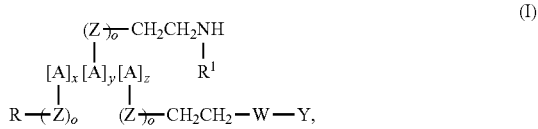

where each A is an independently selected saccharide moiety; each W is an independently selected beta-amino alcohol moiety; each Y is an independently selected organosilicon moiety; each R is independently selected from substituted or unsubstituted hydrocarbyl groups, ether moieties, amine moieties, and H; each $R^1$ is independently selected from substituted or unsubstituted hydrocarbyl groups and H; each Z is an independently selected ether moiety; each subscript o is independently 0 or 1; subscripts x and y are each independently from ≥0 to <1; subscript z is from >0 to 1, with the proviso that x+y+z=1; and moieties indicated by subscripts x, y, and z may be in randomized or block form in the silicon glycan.

In general, the silicon glycan comprises a glycoside (i.e., at least two saccharides bound to one another via a glycosidic linkage), which is represented in the portion of general formula (I) corresponding to the following moiety (i.e., the "glycoside moiety"):

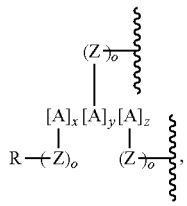

where each saccharide moiety A comprises, alternatively consists essentially of, a saccharide, and subscripts x, y, and z each represent a mole fractions of particular saccharide moieties A within the glycoside moiety. Said differently, each saccharide moiety A is bound to at least one other saccharide moiety A (e.g. via glycosidic linkage), such that each saccharide moiety A is a component of, and collectively form, the glycoside of the silicon glycan. Moreover, each saccharide moiety A indicated by subscripts x, y, and z may be in randomized or block form in the silicon glycan. As described in further detail herein, Z and R represent substituents native to or otherwise appended to each saccharide moiety A within the glycoside moiety of the silicon glycan.

It is to be appreciated that the term "saccharide" may be used synonymously with the term "carbohydrate" under general circumstances, as well as terms like "sugar" under more specific circumstances. The nomenclature of any particular saccharide is not exclusionary with regard to the composition of the silicon glycan as a whole, or any saccharide moiety A in particular. Rather, as will be understood by those of skill in the art, each saccharide moiety A may include, alternatively may be, any moiety that can be described as a saccharide, carbohydrate, sugar, starch, cellulose, and the like, or a derivative or modification thereof, or combinations thereof. Likewise, any combination of more than one saccharide moiety A in the silicon glycan may be described using more descriptive terms. For example, the term "polysaccharide" may be used synonymously with the term "glycoside," where both terms generally refer to a combination of more than one saccharide moiety A in the silicon glycan (e.g. where the combination of saccharide moieties A are linked together via glycosidic linkage(s) and collectively form the glycoside moiety). One of skill in the art will appreciate that terms such as "starch" and "cellulose" may be used to refer to such combinations of saccharide moieties A under specific circumstances (e.g. when a combination of more than one saccharide moiety A in the silicon glycan A conforms to the structure known in the art as a "starch" or a "cellulose", etc.).

As introduced above, subscripts x, y, and z each represent a mole fraction of particular saccharide moieties A within the glycoside moiety of the silicon glycan, with values selected such that x+y+z=1. More specifically, as represented by formula (I), not every saccharide moiety A within the glycoside moiety of the silicon glycan need be substituted identically. As such, the glycoside moiety of the silicon glycan may be described in various ways, e.g. in terms of overall composition using the mole fractions represented by subscripts x, y, and z, in terms of the mean average number of substitutions per saccharide moiety A (i.e., the degree of substitution (DS), as understood by those of skill in the art), etc., or combinations thereof.

In general, subscript x is a mole fraction of from ≥0 to <1. In specific embodiments, subscript x is a mole fraction of from 0 to 0.99, such as from 0.1 to 0.99, alternatively of from 0.3 to 0.99, alternatively of from 0.5 to 0.99, alternatively of from 0.6 to 0.99, alternatively of from 0.7 to 0.99, alternatively of from 0.7 to 0.9, alternatively of from 0.7 to 0.85. In general, subscript y is a mole fraction of from ≥0 to <1. In certain embodiments, subscript y is a mole fraction of from 0 to 0.9, such as from 0.001 to 0.7, alternatively of from 0.001 to 0.5, alternatively of from 0.002 to 0.5, alternatively of from 0.002 to 0.4, alternatively of from 0.002 to 0.3, alternatively of from 0.005 to 0.3, alternatively of from 0.01 to 0.25. In general, subscript z is a mole fraction of from >0 to 1. In particular embodiments, subscript z is a mole fraction of from 0.00001 to 0.9, such as from 0.00001 to 0.7, alternatively of from 0.00001 to 0.5, alternatively of from 0.00001 to 0.3, alternatively of from 0.00001 to 0.2, alternatively of from 0.00001 to 0.15, alternatively of from 0.000015 to 0.15, alternatively of from 0.00002 to 0.15, alternatively of from 0.00002 to 0.1, alternatively of from 0.00005 to 0.09, alternatively of from 0.0001 to 0.09, alternatively of from 0.0005 to 0.09, alternatively of from 0.001 to 0.09.

In general, the silicon glycan has an average degree of organosilicon moiety substitution (DS) (i.e., an average number of saccharide moieties $[A]_z$) of from 0.00001 to 0.99 organosilicon moieties per saccharide moiety A (i.e., based on the total number of saccharide moieties $[A]_x+[A]_y+[A]_z$). For example, in certain embodiments, the degree of organosilicon moiety substitution of the silicon glycan is from 0.00001 to 0.5, alternatively from 0.00001 to 0.2, alternatively from 0.00001 to 0.15, alternatively from 0.0001 to 0.5, alternatively from 0.0001 to 0.2, alternatively from 0.0001 to 0.15.

The degree of aminoethyl substitution of the aminoethyl polysaccharide (A) (i.e., the average number of saccharide moieties $[A]_y$ per saccharide moiety [A], based on the total number of saccharide moieties $[A]_x+[A]_y+[A]_z$) may be determined by various techniques, which are known by those of skill in the art. For example, the nitrogen content of the aminoethyl polysaccharide (A) (e.g. as determined via the Kjeldahl method) may be utilized directly, or adjusted based on the particular method of preparing the same. For example, as will be described in view of the method below, the nitrogen content of the aminoethyl polysaccharide (A) may be selected/controlled based on the nitrogen content of a hydroxyl-functional polysaccharide utilized to prepare the aminoethyl polysaccharide (A).

Regardless of the particular proportions described by subscripts x, y and z, the total number of saccharide moieties A in the silicon glycan (e.g. the degree of polymerization thereof) may vary, and is generally from 10 to 10,000. For example, in certain embodiments, the silicon glycan comprises a total of from 10 to 10,000 saccharide moieties A, such as from 100 to 8000, alternatively from 250 to 6000, alternatively from 400 to 3600 saccharide moieties A.

Each saccharide moiety A may be the same as or different from any other saccharide moiety A in the silicon glycan. For example, in certain embodiments, each saccharide moiety A is the same (e.g. comprises, alternatively consists essentially of, the same saccharide). In other embodiments, the silicon glycan comprises at least one saccharide moiety A that is different than at least one other saccharide moiety A (e.g. with respect to the saccharides thereof). General examples of particular saccharides suitable for saccharide moiety A include those conventionally referred to as monosaccharides and/or sugars. Such monosaccharides include pentoses (i.e., furanoses), such as riboses, xyloses, arabinoses, lyxoses, fructoses, etc., and hexoses (i.e., pyranoses), such as glucoses, galactoses, mannoses, guloses, idoses, taloses, alloses, altroses, etc. As such, one of skill in the art will appreciate that the glycoside moiety of the silicon glycan may comprise and/or be defined as a disaccharide (e.g. a sucrose, a lactose, a maltose, a trehalose, etc.), an oligosaccharide (e.g. a malto-oligosaccharide, such as a maltodextrin, a rafinose, a stachyose, a fructooligosaccharides, etc.), a polysaccharide (e.g. a cellulose, a hemicellulose, a pectin, a glycogen, a hydrocolloid, a starch such as an amylose, an amylopectin, a modified starch, etc.), or the like, or combinations thereof.

In certain embodiments, the silicon glycan comprises at least one saccharide moiety A that is a hexose. In some such embodiments, the hexose has general formula:

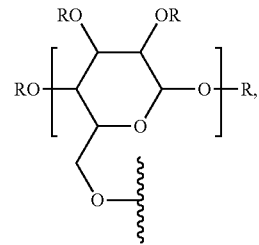

which, as understood by those of skill in the art, encompasses both internal as well as terminal monomers of the glycoside moiety formed therefrom. In such embodiments, each R is independently selected and as described herein. In specific embodiments, the glycoside moiety of the silicon glycan comprises, alternatively consists essentially of, glucose monomers, and thus corresponds to the general formula:

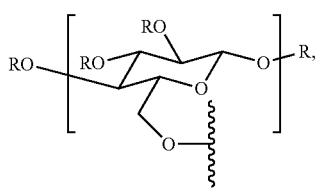

which, as understood by those of skill in the art, also encompasses both internal as well as terminal monomers of the glycoside moiety formed therefrom. In such specific embodiments, each R is independently selected and as described herein.

In some embodiments, the glycoside moiety of the silicon glycan comprises and/or may be defined as a polysaccharide selected from *pullulans*, mannans, galactomannans, xyloglucans, xanthans, hydroxyethyl celluloses, carboxymethyl celluloses, ethyl hydroxyethyl celluloses, hydroxyethyl methyl celluloses, hydroxypropyl methyl celluloses, methyl celluloses, ethyl celluloses, and the like, as well as combinations thereof.

In certain embodiments, the glycoside moiety of the silicon glycan comprises a derivative (e.g. a modified and/or altered version) of one of the oligosaccharides or polysaccharides described above. For example, the glycoside moiety may be a hydrophobically modified polysaccharide, a cationically modified polysaccharide, a hydrophilically modified polysaccharide a copolymerized polysaccharide, or a combination thereof. Such modifications typically alter the saccharide moieties A within the glycoside by appending substituents thereto (e.g. via the native hydroxyl moieties thereof, such as those at positions C2, C3, and/or C6 when the saccharide moieties A comprises a hexose). In particular, as introduced and shown above with respect to formula (I), the saccharide moieties A designated by subscript x of the silicon glycan comprise substituents R, and optionally ether moieties Z, as described below. For example, R may be H in any saccharide moieties A designated by subscript x in the glycoside moiety. R is typically H in each native (i.e., naturally occurring and/or unsubstituted) saccharide in any particular saccharide moiety A, such that the particular saccharide moiety A has at least one free hydroxyl substituent.

When the glycoside moiety of the silicon glycan comprises a polysaccharide derivative as described above, at least one R is selected from substituted or unsubstituted hydrocarbyl groups, ether moieties, and amine moieties. However, the silicon glycan may comprise any number of substituents R so defined, limited only by saccharide moieties A of the glycoside moiety, the DS of the glycoside moiety, etc., as will be understood by those of skill in the art in view of the description herein.

With regard to hydrocarbyl groups of R, the term "substituted" describes hydrocarbon moieties where either one or more hydrogen atoms is replaced with atoms other than hydrogen (e.g. a halogen atom, such as chlorine, fluorine, bromine, etc.), a carbon atom within a chain of the hydrocarbon is replaced with an atom other than carbon (i.e., R includes one or more heteroatoms (e.g. oxygen, sulfur, nitrogen, etc.) within the chain), or both. As such, it will be appreciated that R includes hydrocarbon moieties that may have substituents in and/or on (i.e., appended to and/or integral with) carbon chains/backbones thereof, such that R may comprise or be an ether, an amine, etc.

In general, hydrocarbyl groups suitable for R may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g., isopentyl, neopentyl, and/or tert-pentyl), hexyl, dodecyl, hexadecyl, etc., as well as other linear or branched saturated hydrocarbon groups having from 6 to 18 carbon atoms. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. For example, specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4, 3,3-nonafluorohexyl, 8,8,8,7,7-pentafluorooctyl, 2,2-difluorocyclopropyl, 2,3-difluorocyclobutyl, 3,4-difluorocyclohexyl, 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated halogenated aryl groups include the aryl groups described above where one or more hydrogen atoms is replaced with a halogen atom, such as F or Cl. Specific examples of halogenated aryl groups include chlorobenzyl and fluorobenzyl groups.

In certain embodiments, R may comprise an ether moiety having the average formula $-(OC_nH_{2n})_m-$, where subscript n is independently selected from 2 to 4 in each moiety indicated by subscript m, and subscript m is from 1 to 200. Those skilled in the art readily understand that additional and/or alternative groups may exist in the ether moiety, which do not substantially diminish the utility or properties of the glycoside moiety of the silicon glycan. In certain embodiments, R may comprise a polyether having the formula $-(OC_2H_4)_q(OC_3H_6)_r(OC_4H_8)_s-$, where subscripts q, r, and s are each independently from 0 to 200, with the proviso that $1 \leq q+r+s \leq 600$, and units indicated by subscripts q, r, and s may be in randomized or block form in the polyether. In specific embodiments, each of subscripts q, r, and s is 4 independently from 0 to 100, alternatively from 0 to 50, alternatively from 0 to 20, with the proviso above. In certain embodiments, subscripts q, r, and s are each independently selected such that $1 \leq q+r+s \leq 300$, alternatively such that $1\ q+r+s \leq 200$, alternatively such that $1 \leq q+r+s \leq 60$. One of skill in the art will understand that the moieties indicated by subscripts m, q, r, and s above are oxyalkylene units, such that R comprises a polyoxyalkylene when any two or more such moieties are present therein. As such, R may be selected from polyoxyalkylene groups, i.e., moieties comprising multiple oxyalkylene units. In specific embodiments, each the oxyalkylene units indicated by subscripts q, r, and s, where present in R, may independently be branched or linear.

In certain embodiments, R may comprise an amine moiety, such as a tertiary amine moiety, a quaternary ammonium moiety (e.g. a trimethylammonium moiety), or combinations thereof. Tertiary amines have the formula $-NR'_2$, where each R' is independently selected from substituted and unsubstituted hydrocarbyl groups and ether moieties (e.g. any of the hydrocarbyl groups and ether moieties described herein), or where each R' is part of, and together form, a cyclic moiety such that the amine moiety comprises a heterocycle (e.g. an N-substituted piperidine, morpholine, etc.). Cations of such tertiary amine moieties are protonated or alkylated forms thereof, having the general formula $-[N(R')_2H]^+$ or $-[N(R')_3]^+$ where each R' is independently selected and as defined above. In such embodiments, depending on the particular R' selected, the glycoside moiety of the silicon glycan may comprise and/or be defined as a N,N-diethylaminoethyl hydroxyethylcellulose, N,N-dimethylaminoethyl hydroxyethylcellulose, N,N-diisopropylaminoethyl hydroxyethylcellulose, N,N-dimethylaminopropyl hydroxyethylcellulose, N-ethyl piperidine hydroxyethylcellulose, N-ethyl morpholine hydroxyethylcellulose, N-ethyl pyrrolidine hydroxyethylcellulose, or combinations thereof.

It is to be appreciated that each R may be the same as or different from any other R in the silicon glycan. Moreover, each R may comprise the same or different functional moieties therein. For example, in certain embodiments, each R is selected from H and alkyl groups, where each alkyl group is optionally substituted (e.g. terminally and/or pendantly) with one or more of the tertiary amino moieties and/or the polyoxyalkylene groups described above. In these embodiments, each R may be said to be selected from substituted or unsubstituted hydrocarbyl groups, ether moieties, amine moieties, and H, where one of skill in the art will understand, in view of this description, that substituted hydrocarbyl groups suitable for R may comprise ether and/or amine moieties. In specific embodiments, each R is independently selected from H, $C_1$-$C_{18}$ hydrocarbyl groups, polyoxyalkylene groups, and tertiary amino groups.

The silicon glycan may comprise substituents Z. More specifically, with reference to formula (I), each subscript o is independently 0 or 1, such that each saccharide moiety A indicated by subscripts x, y, and z may independently be substituted with substituent Z, which is described in further detail below. In certain embodiments, the silicon glycan comprises at least one saccharide moiety A indicated by subscript x where subscript o is 1. In these or other embodiments, the silicon glycan comprises at least one saccharide moiety A indicated by subscript x where subscript o is 0. In these or other embodiments, the silicon glycan comprises at least one saccharide moiety A indicated by subscript y where subscript o is 1. In some such embodiments, subscript o is 1 in each moiety indicated by subscript y. In these or other embodiments, subscript o is 1 in each moiety indicated by subscript z, as will be understood in view of the description herein.

In general, each Z is a divalent linking group comprising an ether moiety (hereinafter referred to as the "ether moiety Z"). More specifically, each ether moiety Z is independently selected, and may be any ether moiety including at least one, alternatively at least two, ether groups. Each ether moiety Z may be the same as any or each other ether moiety Z. Typically, the ether group(s) of each ether moiety Z have the formula $-(C_tH_{2t}O)_u-$, where subscript t is independently selected from 2 to 4 in each moiety indicated by subscript u, and subscript u is from 1 to 50. In some embodiments, subscript u is from 1 to 25, alternatively from 1 to 10, alternatively from 1 to 5. In certain embodiments, each subscript t is 2 and each subscript u is 1, such that each ether moiety Z comprises an ethyl ether and the glycoside moiety of the silicon glycan may comprise and/or be defined as a hydroxyethyl cellulose. In some embodiments, subscripts o and ether moieties Z may be collectively selected such that the glycoside moiety of the silicon glycan may comprise and/or be defined as a carboxymethyl cellulose, an ethyl hydroxyethyl cellulose, a hydroxyethyl methyl cellulose, a hydroxypropyl methyl cellulose, or the like, or combinations thereof. In view of these examples, one of skill in the art will appreciate that ether moiety Z may comprise groups in addition to the ether group(s), such as divalent hydrocarbon linking groups (e.g. methylene, ethylene, and propylene linking groups, etc.).

The glycoside moiety of the silicon glycan may include aminoethyl saccharide moieties. In particular, with reference to formula (I), the silicon glycan may comprise saccharide moieties A indicated by subscript y, which each include the aminoethyl moiety of sub-formula $-CH_2CH_2N(H)R^1$, where $R^1$ is a hydrocarbyl group or H. More specifically, each $R^1$ is independently selected from substituted or unsubstituted hydrocarbyl groups and H. Examples of suitable hydrocarbyl groups include those described above with respect to substituent R. In certain embodiments, each $R^1$ is independently selected from H and alkyl groups, such that, when $R^1$ is alkyl, the aminoethyl moiety is further defined as an N-alkyl aminoethyl moiety. In particular embodiments, each $R^1$ is the same as one another. For example, in some such embodiments, each $R^1$ is H or a $C_1$-$C_4$ hydrocarbyl group. In specific embodiments, each $R^1$ is H. In some embodiments, each $R^1$ is ethyl or methyl.

In certain embodiments, some of the aminoethyl moieties are protonated, and thus of the sub-formula $-CH_2CH_2-[N(H)_2R^1]+$. The proportion of protonated aminoethyl moieties in the silicon glycan is limited only by the degree of aminoethyl substitution, and may be selected by one of skill in the art (e.g. during preparation of the silicon glycan, after preparation of the silicon glycan by combining an acid therewith, etc.).

With continued reference to formula (I), and as introduced above, the saccharide moieties A indicated by subscript z comprise a moiety of sub-formula $-CH_2CH_2-W-Y$, where W is a divalent beta-amino alcohol moiety (hereinafter the "beta-amino alcohol moiety W") and Y is an organosilicon moiety (hereinafter the "organosilicon moiety Y").

Each beta-amino alcohol moiety W is independently selected, such that any beta-amino alcohol moiety W may be the same as or different from any other beta-amino alcohol moiety W present in the silicon glycan. In particular, each beta-amino alcohol moiety W may be linear or branched with respect to the position of the alcohol group thereof, and may be protonated or unprotonated at the amine group (i.e., contain an amine or an ammonium cation). For example, each beta-amino alcohol moiety W may independently have one of the following formulas:

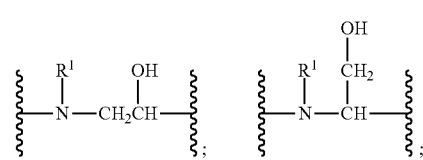

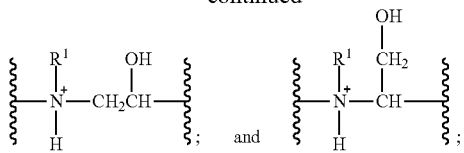

where each $R^1$ is independently selected and as defined above.

Each organosilicon moiety Y is independently selected, such that each organosilicon moiety Y may be the same as any or each other organosilicon moiety Y. In certain embodiments, each organosilicon moiety Y is the same as at least one, alternatively each, other organosilicon moiety Y. The organosilicon moiety Y is not generally limited in terms of structure and/or composition, and may be any moiety comprising at least one, alternatively at least two, organosilicon groups. For example, the organosilicon moiety Y may comprise an organosilyl group, an organosiloxane group, or combinations thereof. In certain embodiments, the organosilicon moiety Y is itself considered an organosilicon group.

In some embodiments, at least one, alternatively at least two, alternatively each organosilicon moiety Y comprises, alternatively is, a silane moiety. In such embodiments, the silane moiety typically has the general formula:

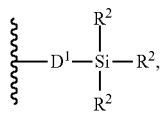

where $D^1$ is a divalent linking group; and each $R^2$ is independently selected from substituted or unsubstituted hydrocarbyl groups, alkoxy groups, and siloxy groups.

In general, $D^1$ is independently selected in each silane moiety present in any organosilicon moiety Y. Typically, $D^1$ is selected from divalent substituted or unsubstituted hydrocarbon groups, which may optionally be modified or substituted, e.g. with alkoxy, siloxy, silyl, amino, amido, acetoxy, and aminoxy groups. $D^1$ may be linear or branched. When branched, $D^1$ may optionally be bonded (e.g. crosslinked) to a siloxane segment or a silane moiety (i.e., other than the silane represented by the sub-formula $-SiR^2_3$ in the general silane moiety formula above. In some embodiments, $D^1$ is a $C_1$-$C_{20}$ hydrocarbon group. However, $D^1$ may be a hydrocarbon groups comprising a backbone having at least one heteroatom (e.g. O, N, S, etc.). For example, in some embodiments, $D^1$ is a hydrocarbon having a backbone comprising an ether moiety.

Each $R^2$ is independently selected, and may be linear, branched, cyclic, or combinations thereof. While independently selected from substituted or unsubstituted hydrocarbyl groups, alkoxy and siloxy groups, each $R^2$ may comprise a combination thereof, such as a combination of hydrocarbyl groups and siloxy groups, as will be appreciated from the description herein. Examples of suitable substituted or unsubstituted hydrocarbyl groups for use as $R^2$ are set forth above with respect to R of general formula (I). Examples of suitable alkoxy groups include those having the general formula —O—R, where R is as defined above. Specific examples of suitable alkoxy groups include methoxy, ethoxy, propoxy, butoxy, phenoxy, etc. Examples of suitable siloxy groups include [M], [D], [T], and [Q] units, which, as understood in the art, each represent structural units of individual functionality present in organopolysiloxanes. More specifically, [M] represents the monofunctional unit of general formula $R^3_3SiO_{1/2}$; [D] represents the difunctional unit of general formula $R^3_2SiO_{2/2}$; [T] represents the trifunctional unit of general formula $R^3SiO_{3/2}$; and [Q] represents the tetrafunctional unit of general formula $SiO_{4/2}$, as shown by the general structural moieties below:

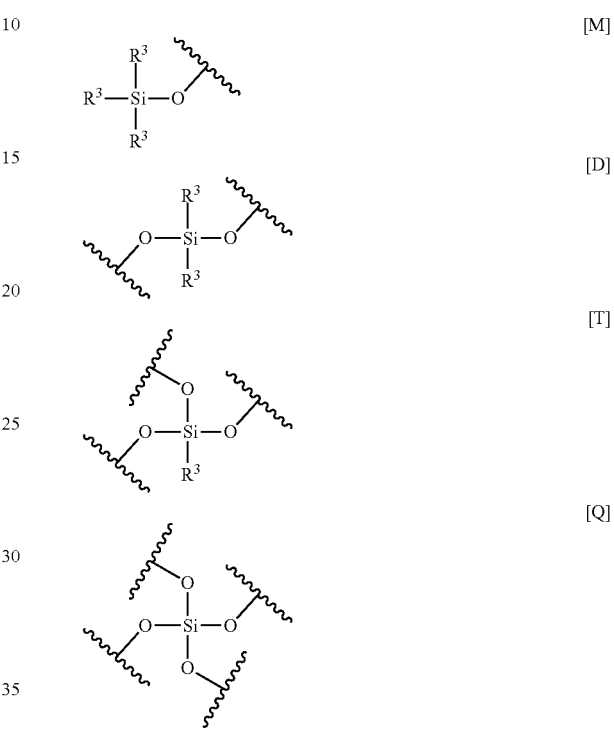

In these general structural moieties, each $R^3$ is independently a monovalent or polyvalent substituent. As understood in the art, specific substituents suitable for each $R^3$ are not limited, and may be monoatomic or polyatomic, organic or inorganic, linear or branched, substituted or unsubstituted, aromatic, aliphatic, saturated or unsaturated, and combinations thereof.

Typically, each $R^3$ is independently selected from hydrocarbyl groups and siloxy groups. The hydrocarbyl group(s) represented by $R^3$, when present, may be substituted or unsubstituted, and may be aliphatic, aromatic, cyclic, alicyclic, etc., as described above with respect to the examples of hydrocarbyl groups suitable for R, which are equally exemplary of those suitable for use with respect to $R^3$. The siloxy group(s) represented by $R^3$, when present, may be substituted or unsubstituted, and may comprise, alternatively may be, any combination of [M], [D], [T], and [Q] units (i.e., the silane moiety may comprise a branched and/or dendrimeric siloxane).

In some embodiments, at least one, alternatively at least two, alternatively each organosilicon moiety Y of the silicon glycan comprises, alternatively is, an organopolysiloxane. In such embodiments, the organopolysiloxane typically has the formula:

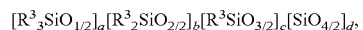

where each $R^3$ is as defined above, with the proviso that at least one $R^3$ is a silicon-bonded divalent linking group bonded to the beta-amino alcohol moiety W; and subscripts a, b, c, and d are each mole fractions such that a+b+c+d=1, with the proviso that a+b+c>0.

It will be appreciated by those of skill in the art that the siloxy moieties indicated by subscripts a, b, c, and d correspond to [M], [D], [T], and [Q] siloxy units, respectively, as introduced and described above. In some embodiments, the organopolysiloxane comprises repeating [D] units, i.e., where subscript b>0. In these embodiments, subscript b is typically a value of from 0.3 to 1 (e.g. 0.3≤b≤1), such as from 0.3 to 0.9999, alternatively from 0.3 to 0.999, alternatively from 0.3 to 0.99, alternatively from 0.3 to 0.9, alternatively from 0.5 to 0.999, alternatively from 0.6 to 0.999, alternatively from 0.7 to 0.99, alternatively from 0.8 to 0.99, alternatively from 0.85 to 0.99, alternatively from 0.9 to 0.99. Subscript a is typically a value of from 0 to 0.1 (0≤a≤0.1), such as from 0 to 0.099, alternatively from 0 to 0.09, alternatively from 0 to 0.085, alternatively from 0 to 0.08, alternatively from 0 to 0.075, alternatively from 0 to 0.07, alternatively from 0 to 0.065, alternatively from 0 to 0.06, alternatively from 0 to 0.055, alternatively from 0 to 0.05, alternatively from 0.001 to 0.05, alternatively from 0.002 to 0.05, alternatively from 0.005 to 0.01. Subscripts c and d are typically each an independently selected value of from 0 to 0.1 (e.g. 0≤c≤0.1 and 0≤d≤0.1), such as from 0 to 0.09, alternatively from 0 to 0.075, alternatively from 0 to 0.05, alternatively from 0 to 0.025, alternatively from 0 to 0.009, alternatively from 0 to 0.001, alternatively from 0 to 0.0001. In certain embodiments, the organopolysiloxane comprises a linear siloxane segment, where subscript b is from 0.9 to 1, subscript a is from 0 to 0.1, and subscripts c and d are each 0. When the organopolysiloxane comprises repeating [D] units, the number of specific [D] units (i.e., the degree of polymerization, DP) in any one siloxane segment is not limited. Typically, such siloxane segments comprise from 1 to 700 repeating [D] units, such as from 2 to 600, alternatively from 2 to 500, alternatively from 5 to 400, alternatively from 5 to 300, alternatively from 10 to 250, alternatively from 10 to 200, alternatively from 15 to 150, alternatively from 15 to 100, alternatively from 15 to 50 repeating [D] units.

With respect to both the silane moiety and the organopolysiloxane described above (i.e., when either or both is utilized in or as the organosilicon moiety Y), the presence and proportion of [M], [D], [T], and [Q] units are independently selected, as is the particular substituent for each $R^3$ of each silyl substituent of the silane moiety as well as for each $R^3$ of any particular siloxy unit (e.g. those indicated by subscripts a, b, and c). For example, a proportion of [T] and [Q] units of or around 0 is typically selected to increase the linearity of the organopolysiloxane, such as when the organopolysiloxane is a linear organopolysiloxane. Such organopolysiloxanes are typically linear or substantially linear, but may include some branching attributable to [T] and/or [Q] units (e.g. where c+d>0). Conversely, the proportion of [T] and/or [Q] units is selected to be greater than 0 when the organopolysiloxane is a resin. Accordingly, one of skill in the art will select the composition of the siloxane segments to control the composition of the organopolysiloxane, and thus the silicon glycan, e.g. based on a desired property of a particular organopolysiloxane, a desired/intended property and/or characteristic (e.g. physical, chemical, aesthetic, etc.) of any of: the silicon glycan; a particular phase (e.g. a non-aqueous, continuous, and/or silicone phase) of an emulsion prepared therewith and/or the emulsion itself; a formulation comprising the silicon glycan; a coating formed from such a formulation; and combinations thereof. For example, it may be desirable for the silicon glycan to have a high melting temperature and/or softening point, or for a formulation prepared therewith to be in a specific form (e.g. the form of a solid, gel, etc.), and selecting the composition of the organopolysiloxane of the silicon glycan may allow one of skill in the art to achieve a range of such desirable properties. In general, when linear siloxane segments are utilized in the organosilicon moiety Y, layers or coatings formed from compositions comprising the silicon glycan in accordance with the present disclosure will typically have improved feel (e.g. comfortable deposit) and flexibility as compared to embodiments where the organopolysiloxane includes increased branching attributable to [T] and/or [Q] units. When resinous organopolysiloxanes are used in or as the organosilicon moiety Y, products formed with/from the compositions comprising the silicon glycan in accordance with the present disclosure will typically have increased hardness and transfer resistance as compared to embodiments where more linear siloxane segments are utilized.

A method of preparing the silicon glycan is also provided, and is generally referred to hereinafter as the "preparation method". The preparation method comprises reacting (A) an aminoethyl polysaccharide and (B) an epoxide-functional organosilicon compound to give the silicon glycan.

As will be understood by one of skill in the art in view of the description herein, the aminoethyl polysaccharide (A) utilized in the preparation method forms a portion of the silicon glycan corresponding to the glycoside moiety described above. Similarly, the epoxide-functional organosilicon compound (B) utilized in the preparation method forms a portion of the silicon glycan corresponding to the organosilicon moiety Y. As described in additional detail below, the beta-amino alcohol moiety W is generally formed by the reaction of components (A) and (B).

The aminoethyl polysaccharide (A) has the general formula (II):

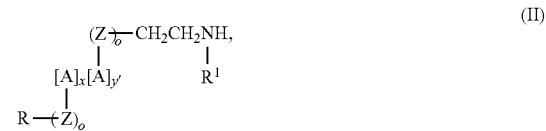

where each A, Z, R, $R^1$, and subscript o are independently selected and as defined above with respect to formula (I); subscript x is from ≥0 to <1; subscript y' is from >0 to 1, with the proviso that x+y'=1; and moieties indicated by subscripts x and y' may be in randomized or block form in the aminoethyl polysaccharide (A).

The aminoethyl polysaccharide (A) is not particularly limited, and generally corresponds to the glycoside moiety in formula (I) described above. For example, just as described above with respect to the saccharide moieties A indicated by subscript y of formula (I), each $R^1$ of the aminoethyl polysaccharide (A) of formula (II) is independently selected from hydrocarbyl groups and H. Likewise, in certain embodiments, at least one $R^1$ is an alkyl group (e.g. a $C_1$-$C_4$ alkyl group), such that the aminoethyl polysaccharide (A) may be further defined as an N-alkyl aminoethyl polysaccharide.

In certain embodiments, some of the aminoethyl moieties of the aminoethyl polysaccharide (A) (i.e., those represented by sub-formula —$CH_2CH_2N(H)R^1$ in general formula (II) above) are protonated, and thus of the sub-formula —$CH_2CH_2$—[$N(H)_2R^1$]+. The proportion of protonated aminoethyl moieties in the aminoethyl polysaccharide (A) is limited only by the degree of aminoethyl substitution, and may be selected by one of skill in the art (e.g. during preparation of the aminoethyl polysaccharide (A) by limiting the amount of neutralization thereof, after preparation of the aminoethyl polysaccharide (A) by combining an acid therewith, etc.).

Each of components (A) and (B) may be obtained or formed. In certain embodiments, the preparation method comprises preparing the aminoethyl polysaccharide (A). In particular, the preparation method may include reacting (A1) a hydroxyl-functional polysaccharide and (A2) an aziridinium halide compound to give the aminoethyl polysaccharide (A). In such embodiments, the aminoethyl polysaccharide (A) may be defined, or otherwise considered as, an intermediate in the preparation method of the silican glycan.

As will be understood by one of skill in the art in view of the description herein, the hydroxyl-functional polysaccharide (A1) forms the polysaccharide portion of the aminoethyl polysaccharide (A), and ultimately the glycoside moiety of the silican glycan. As such, the description above with respect to the glycoside moiety applies equally to the hydroxyl-functional polysaccharide (A1), such that the hydroxyl-functional polysaccharide (A1) may comprise any of the oligosaccharides or polysaccharides described above. For example, the hydroxyl-functional polysaccharide (A1) may comprise, alternatively consist essentially of, a cellulose, a hemicellulose, a pectin, a glycogen, a hydrocolloid, a starch, a modified starch, or the like, or combinations thereof. In some embodiments, the hydroxyl-functional polysaccharide (A1) comprises a hydroxyalkyl cellulose ether. In such embodiments, the hydroxyl-functional polysaccharide (A1) may comprise a single type of hydroxyalkyl group, or more than one type of hydroxyalkyl group. For example, the hydroxyl-functional polysaccharide (A1) may comprise 2-hydroxyethyl groups, 2-hydroxypropyl groups, 3-hydroxypropyl groups, etc., or combinations thereof. In specific embodiments, the hydroxyl-functional polysaccharide (A1) comprises, alternatively is, a pullulan, mannan, galactomannan, xyloglucan, xanthan, hydroxyethyl cellulose, hydroxypropyl cellulose, carboxymethyl cellulose, ethyl hydroxyethyl cellulose, hydroxyethyl methyl cellulose, hydroxypropyl methyl cellulose, methyl cellulose, ethyl cellulose, and the like, as well as combinations thereof.

The hydroxyl-functional polysaccharide (A1) may comprise, alternatively may be, a modification/derivative (e.g. a modified and/or altered version) of one of the oligosaccharides or polysaccharides defined above, such as a hydrophobically modified polysaccharide, a cationically modified polysaccharide, a copolymerized polysaccharide, or a combination thereof. Specific examples of such polysaccharides include N,N-diethylaminoethyl hydroxyethylcelluloses, N,N-dimethylaminoethyl hydroxyethylcelluloses, N,N-diisopropylaminoethyl hydroxyethylcelluloses, N,N-dimethylaminopropyl hydroxyethylcelluloses, N-ethyl piperidine hydroxyethylcelluloses, N-ethyl morpholine hydroxyethylcelluloses, N-ethyl pyrrolidine hydroxyethylcelluloses, and the like, as well as derivatives, modifications, and combinations thereof.

In certain embodiments, the hydroxyl-functional polysaccharide (A1) is a hydroxy ethyl cellulose. In such embodiments, the hydroxyl-functional polysaccharide (A1) may be cationically, hydrophobically, and/or hydrophillically modified, e.g. via hydrocarbon moieties, polyoxyalkylene moieties, and/or amine moieties being appended thereto.

The degree of substitution of the hydroxyl-functional polysaccharide (A1) (e.g. with respect to the hydroxyl functionality, the number of hydroxyalkyl groups, the number of quaternary ammonium groups, etc., per saccharide moiety A therein) is determined by analysis of the hydroxyl-functional polysaccharide (A1). As understood by those of skill in the art, such analysis may include, for example, determining ethoxyl and/or hydroxyethoxyl substitution (e.g. when the hydroxyl-functional polysaccharide (A1) is a cellulose ether) via the Zeisel gas chromatographic (GC) technique outlined in ASTM test method D4794-94 (2017), determining methoxyl and/or hydroxypropoxyl substitution (e.g. when the hydroxyl-functional polysaccharide A1 is a cellulose ether) via the Zeisel GS technique as outlined in ASTM test method D3876-96(2013), etc., or combinations thereof. Such techniques are known in the art, and will be independently selected by one of skill in the art, e.g. based on the type of hydroxyl-functional polysaccharide (A1) being utilized, the functional groups appended thereto, the degree of substitution thereof, etc.

In certain embodiments, the hydroxyl-functional polysaccharide (A1) is a hydroxylalkyl cellulose ether having an average degree of substitution of from 0.50 to $4.0C_1$-$C_6$ alkyl ether groups per saccharide moiety A, such as from 0.5 to 2.5, alternatively from 0.5 to 3.5, alternatively from 1.0 to 2.5, alternatively from 1.5 to 2.5.

The hydroxyl-functional polysaccharide (A1) typically has a weight average molecular weight ($M_w$) of at least about 2500. In certain embodiments, the hydroxyl-functional polysaccharide (A1) has a $M_w$ of at least 2500, alternatively at least 5000, alternatively at least1 0,000, alternatively at least 25,000, alternatively at least 50,000, alternatively at least 75,000. In these or other embodiments, the hydroxyl-functional polysaccharide (A1) may have a $M_w$ of from 70,000 to 3,000,000, such as from 100,000 to 1,500,000, alternatively of from 150,000 to 1,000,000. The weight average molecular weight may be readily determined using Gel Permeation Chromatography (GPC) equipped with Multi Angle Light Scattering (MALLS) detection techniques as described by W. Gao, X. M. Liu, and R. A. Gross, Polym. Int., 58, 1115-1119 (2009).

The aziridinium halide compound (A2) has the general formula:

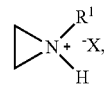

where $R^1$ is as defined above, and —X is chloride or bromide. As will be understood by those of skill in the art, the aziridinium halide compound (A2) forms the aminoethyl moiety of sub-formula —$CH_2CH_2N(H)R^1$ of the aminoethyl polysaccharide (A). As such the description above with respect to the scope and limitations of $R^1$ is equally applicable with respect to the aziridinium halide compound (A2). In certain embodiments, the aziridinium halide compound (A2) is selected from the chloride and/or bromide salt of a cation selected from aziridinium, N-methyl aziridinium, N-ethyl aziridinium, N-propyl aziridinium, N-butyl aziridinium, and combinations thereof. In specific embodiments, the aziridinium halide compound (A2) comprises, alternatively is, aziridinium chloride or N-methyl aziridinium chloride.

The aziridinium halide compound (A2) may be prepared or otherwise obtained by any method known by those of skill in the art. For example, the aziridinium halide compound (A2) may be formed in situ by neutralizing a halide salt of a corresponding beta haloethylamine with a stoichiometric amount of a base (e.g. NaOH, KOH, etc.).

The hydroxyl-functional polysaccharide (A1) and the aziridinium halide compound (A2) may be reacted in various amounts to form aminoethyl polysaccharide (A). Typically, component (A2) is utilized in at least a 1:1 stoichiometric ratio based on the number of hydroxyl groups of (A1) are to be alkylated. As such, the amount of the aziridinium halide compound (A2) is typically selected based on the amount, degree of polymerization, and/or degree of substitution of the hydroxyl-functional polysaccharide (A1), as will be understood by those of skill in the art. An excess, or gross excess, of component (A2) may be utilized in order to maximize the degree of aminoethyl substitution of the aminoethyl polysaccharide (A). For example, components (A1) and (A2) may be utilized in a 1:≥1 stoichiometric ratio (A1:A2), even where the degree of free hydroxyl substitution of component (A1) is ≤1. Higher or lower ratios may also be utilized.

The hydroxyl-functional polysaccharide (A1) and the aziridinium halide compound (A2) may be reacted under varying conditions, which are independently selected (e.g. in view of the particular hydroxyl-functional polysaccharide (A1) and/or aziridinium halide compound (A2) being utilized, the particular aminoethyl polysaccharide (A) to be formed, etc.). For example, the temperature and/or atmosphere of the reaction of components (A1) and (A2) may be independently selected. More specifically, components (A1) and (A2) may be reacted under ambient conditions, under a controlled atmosphere (e.g. under $N_2$, argon, etc.), at an elevated temperature (e.g. of >25° C., such as from 30 to 150, alternatively from 30 to 100, alternatively from 50 to 100, alternatively from 70 to 100 alternatively from 50 to 85° C.), or combinations thereof. In certain embodiments, the reaction components (A1) and (A2) is performed for a time of from 30 minutes to 24 hours, such as from 1 to 12, alternatively from 2 to 6, hours. However, the particular time utilized may differ from these ranges, and will be selected based on the size/scale of the reaction, the particular components being reacted, and the other reaction conditions utilized, as understood by those of skill in the art.

The components (A1) and (A2) may be reacted in the presence of carrier fluid (e.g. a solvent, diluent, vehicle, or combinations thereof), such that the reaction is carried out in the solution, emulsion, suspension, slurry, biphasic mixture, or combinations thereof. The particular solvents, carriers, and/or diluents utilized, and the respective amounts thereof employed, will be independently selected by one of skill in the art, e.g. based the particular hydroxyl-functional polysaccharide (A1) and/or aziridinium halide compound (A2) being utilized, the particular aminoethyl polysaccharide (A) to be formed, etc. For examples, it is understood by those of skill in the art that reactions of polysaccharides may be conducted heterogeneously, e.g. with the polysaccharide suspended, but not dissolved, in a polar organic diluent. However, the various components of the reaction may be employed as homogeneous mixtures (i.e., prior to forming a heterogeneous reaction mixture therewith).

Examples of components suitable for use in or as the carrier fluid, such as for use in or as a diluent in the reaction of components (A1) and (A2) generally include water-soluble polar organic solvents. In certain embodiments, the diluent comprises methanol, ethanol, 1-propanol, 2-propanol, 2-methyl-2-propanol, 2-butanone, tetrahydrofuran, acetone, or combinations thereof. However, additional and/or alternative carrier fluids and/or diluents may also be utilized, such as any of those described in further detail here.

The content of certain solvents (e.g. water, protonated solvents, etc.) in the reaction may be adjusted to effectuate swelling of the polysaccharide, especially when employing the diluent (e.g. in a heterogeneous reaction). As such, the amount of diluent, water, etc., within the reaction will be selected in view of the particular components (e.g. components (A1), (A2), the base, etc.) to achieve sufficient swelling of the hydroxyl-functional polysaccharide (A1) such that the alkylation thereof with the aziridinium halide compound (A2) may proceed accordingly.

The degree of aminoethyl substitution of the aminoethyl polysaccharide (A) may vary, and may be selected and/or controlled, e.g. by the degree of hydroxyl substitution of the hydroxyl-functional polysaccharide (A1), the equivalents of aziridinium halide compound (A2) utilized, the conditions under which components (A1) and (A2) are reacted, etc. Typically, the aminoethyl polysaccharide (A) has average degree of substitution of from 0.05 to 1 aminoethyl groups per saccharide moiety A, such as from 0.075 to 0.75, alternatively from 0.075 to 0.6, alternatively from 0.09 to 0.6, alternatively from 0.1 to 0.6, alternatively from 0.1 to 0.5, alternatively from 0.15 to 0.45. The degree of aminoethyl substitution the aminoethyl polysaccharide (A) may be determined by various techniques, which are known in the art. For example, the nitrogen content of the aminoethyl polysaccharide (A) (e.g. as determined via the Kjeldahl method) may be utilized directly, or adjusted (e.g. based on the nitrogen content of the hydroxyl-functional polysaccharide (A1)) to ascertain the degree of aminoethyl substitution the aminoethyl polysaccharide (A).

The epoxide-functional organosilicon compound (B) has the general formula:

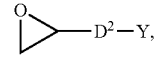

where Y is an independently selected organosilicon moiety; and $D^2$ is a divalent linking group.

In general, $D^2$ is selected from divalent substituted or unsubstituted hydrocarbon groups, which may optionally be modified or substituted, e.g. with alkoxy, siloxy, silyl, amino, amido, acetoxy, and aminoxy groups. $D^2$ may be linear or branched. In some embodiments, $D^2$ is a $C_1$-$C_{20}$ hydrocarbon group. However, $D^2$ may be a hydrocarbon groups comprising a backbone having at least one heteroatom (e.g. O, N, S, etc.). For example, in some embodiments, $D^2$ is a hydrocarbon having a backbone comprising an ether moiety. In some such embodiments, $D^2$ is selected such that the epoxide-functional organosilicon compound (B) comprises a glycidyl ether.

The organosilicon moiety Y of the epoxide-functional organosilicon compound (B) is equivalent to the organosilicon moiety Y of the silicon glycan, i.e., as described above with respect to formula (I). As such, the organosilicon moiety Y of the epoxide-functional organosilicon compound (B) may comprise a silyl moiety, an organopolysiloxane moiety, or both. For example, in some embodiments, the epoxide-functional organosilicon compound (B) has the formula:

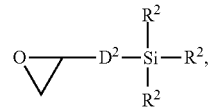

where each $D^2$ and $R^2$ is independently selected and as defined above. In certain embodiments, the epoxide-functional organosilicon compound (B) has the formula:

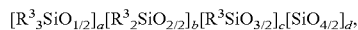

$[R^3{}_3SiO_{1/2}]_a[R^3{}_2SiO_{2/2}]_b[R^3SiO_{3/2}]_c[SiO_{4/2}]_d$, where subscripts a, b, c, and d, and each $R^3$ is independently selected and as defined above, with provisos that a+b+c>0 and at least one $R^3$ comprises an epoxide-functional group. In specific embodiments, for example, at least one $R^3$ is the divalent linking group $D^2$ described above.

The aminoethyl polysaccharide (A) and the epoxide-functional organosilicon compound (B) may be reacted in various amounts to form the silicon glycan. Typically, component (B) is utilized in at least a 1:1 stoichiometric ratio based on the number of ethylamino groups of component (A) are to be alkylated, e.g. via ring-opening addition of the of the ethylamino group amine of component (A) to the epoxide of component (B), thereby forming the beta-amino alcohol W moiety described above. As such, the amount of epoxide-functional organosilicon compound (B) is typically selected based on the amount, degree of polymerization, and/or degree of substitution of the aminoethyl polysaccharide (A), as will be understood by those of skill in the art. An excess, or gross excess, of component (B) may be utilized in order to maximize the degree of silicon substitution of the silicon glycan. For example, components (A) and (B) may be utilized in a 1:≥1 stoichiometric ratio (A:B), even where the degree of aminoethyl substitution of component (A) is ≤1. Higher or lower ratios may also be utilized. For example, in some embodiments, components (A) and (B) may be utilized in a≥1:1 stoichiometric ratio (A:B), e.g. to increase the relative grafting efficiency of the epoxide-functional organosilicon compound (B) onto the aminoethyl polysaccharide (A).

The aminoethyl polysaccharide (A) and the epoxide-functional organosilicon compound (B) may be reacted under varying conditions, which, as will be appreciated by those of skill in the art, may be independently selected (e.g. in view of the particular compounds (A) and/or (B) being utilized, the particular silicon glycan to be formed, the size of the reaction, etc.). For example, the temperature and/or atmosphere of the reaction of components (A) and (B) may be independently selected. More specifically, components (A) and (B) may be reacted under ambient conditions, under a controlled atmosphere (e.g. under $N_2$, argon, etc.), at an elevated temperature (e.g. of >25° C., such as from 30 to 150, alternatively from 30 to 100, alternatively from 50 to 100, alternatively from 50 to 90, alternatively from 60 to 80° C.), or combinations thereof. The reaction temperature is selected based on the particular components of the reaction, and thus may be chosen to minimize evaporative loss (e.g. of a volatile component), achieve reflux (i.e., when performed in a suitable reactor), drive off volatile components, or combinations thereof (e.g. via employment of temperature ramping). In particular embodiments, the reaction is carried out at ambient and/or room temperature (e.g. from 20 to about 30, alternatively from 22 to 28, alternatively from 24 to 26° C.).

The aminoethyl polysaccharide (A) and the epoxide-functional organosilicon compound (B) may be reacted for any amount of time, such as a time of from 30 minutes to 100 hours. For example, in certain embodiments, the reaction components (A) and (B) is performed for a time of from 4 to 48 hours, such as a time of 5, 8, 12, 16, 20, 24, 28, 32, 36, 40, 44, or 47 hours. In some embodiments, a time of from 48 to 100 hours is utilized, such as a time of 50, 60, 70, 80, or 90 hours. However, the particular time utilized may differ from these ranges, and will be selected based on the size/scale of the reaction, the particular components (A) and (B) utilized, and the other reaction conditions selected, as understood by those of skill in the art. In particular embodiments, the reaction components (A) and (B) is performed for a time of from 0.5 to 24 hours, such as from 1 to 18, alternatively from 1 to 12, alternatively from 1 to 6 hours.

The components (A) and (B) may be reacted under a heterogeneous condition, e.g. such as in a multiphase (e.g. biphasic) reaction. Typically, components (A) and (B) are reacted heterogeneously in the presence of a diluent, which may be a multicomponent diluent. In general, the diluent is selected to swell, but not dissolve, the aminoethyl polysaccharide (A), to function as a carrier for component (B), or both. As such, the specific components of the diluent are selected based on the particular aminoethyl polysaccharide (A) utilized (e.g. depending on the solubility, swellability, and/or reactivity thereof) and/or the particular organosilicon compound (B) being utilized (e.g. the solubility and/or functionality of the silane moiety thereof), etc.

The diluent typically comprises an organic solvent. Examples of organic solvents include those comprising an alcohol, such as methanol, ethanol, isopropanol, butanol, and n-propanol; a ketone, such as acetone, methylethyl ketone, and methyl isobutyl ketone; an aromatic hydrocarbon, such as benzene, toluene, and xylene; an aliphatic hydrocarbon, such as heptane, hexane, and octane; a glycol ether, such as propylene glycol methyl ether, dipropylene glycol methyl ether, propylene glycol n-butyl ether, propylene glycol n-propyl ether, and ethylene glycol n-butyl ether; a halogenated hydrocarbon, such as dichloromethane, 1,1,1-trichloroethane and methylene chloride; chloroform; dimethyl sulfoxide; dimethyl formamide, acetonitrile; tetrahydrofuran; white spirits; mineral spirits; naphtha; N-methylpyrrolidone; and the like, as well as derivatives, modifications, and combination thereof. Typically, the organic solvent is a polar organic solvent, such as a solvent compatible with water. Specific examples of such polar organic solvents utilized in certain embodiments include methanol, ethanol, 1-propanol, 2-propanol, 2-methyl-2-propanol, 2-butanone, tetrahydrofuran, acetone, and combinations thereof.

In some embodiments, the diluent comprises a silicone fluid. In such embodiments, the silicone fluid is typically a low viscosity and/or volatile siloxane, such as a low viscosity organopolysiloxane, a volatile methyl siloxane, a volatile ethyl siloxane, a volatile methyl ethyl siloxane, or the like, or combinations thereof. Typically, the silicone fluid has a viscosity at 25° C. in the range of 1 to 1,000 mm²/sec. In some embodiments, the silicone fluid comprises a silicone having the general formula $(R^4R^5SiO)_e$, where each $R^4$ and $R^5$ is independently selected from H and substituted or unsubstituted hydrocarbyl groups, and subscript e is from 3 to 8. Specific examples of suitable silicone fluids include hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, hexamethyldisiloxane, heptamethyloctyltrisiloxane, hexyltrimethicone, and the like, as well as derivatives, modifications, and combinations thereof. Additional examples of suitable silicone fluids include polyorganosiloxanes with suitable vapor pressures, such as from $5 \times 10^{-7}$ to $1.5 \times 10^{-6}$ m$^2$/s. The diluent typically further comprises a polar component, which typically includes water or another polar compound (e.g. dimethylacetamide, hexamethylphosphoramide, hexafluoroisopropanol, dimethylsulfoxide, etc.). The particular content of the polar component of the diluent is adjusted to effectuate swelling of the polysaccharide of component (A). As such, the amount of diluent, the ratio of polar to non-polar or other organic solvent of the diluent, and the ratio of the polar component to components (A) and/or (B), etc., within the reaction will be independently or collectively selected to achieve sufficient swelling of the aminoethyl polysaccharide (A) to facilitate grafting of the organosilicon compound (B) thereto. Likewise, the diluent may comprise one or more additives, which may be independently selected to increase and/or decrease the solubility and/or compatibility of any component of the reaction with the diluent. In certain embodiments, the polar component comprises water. In these or other embodiments, the polar component comprises dimethylacetamide, hexamethylphosphoramide, hexafluoroisopropanol, and/or dimethylsulfoxide.

In certain embodiments, reacting the aminoethyl polysaccharide (A) and the epoxide-functional organosilicon compound (B) to gives a reaction product comprising the silicon glycan, and the preparation method includes isolating the silicon glycan from the reaction product. In such embodiments, any suitable technique and/or protocol for isolation may be utilized. Examples of suitable isolation techniques include decanting, distilling, evaporating, extracting, filtering, freeze drying, ion exchange chromatography (e.g. adsorption), simulated moving bed chromatography, partitioning, phase separating, stripping, and washing. As will be understood by those of skill in the art, may of these techniques may be used in combination (i.e., sequentially) with one another to isolate the silicon glycan. It is to be appreciated that isolating may include, and thus may be referred to as, purifying the silicon glycan. As used herein, isolating the silicon glycan is typically defined as increasing the relative concentration of the silicon glycan as compared to other compounds in combination therewith. As such, as is understood in the art, isolating/purifying may comprise removing the other compounds from such a combination (i.e., decreasing the amount of impurities combined with the silicon glycan) and/or removing the silicon glycan itself from the combination. Regardless of the particular technique(s) selected, purification of the silicon glycan may be performed in sequence (i.e., in line) with the reaction itself, and thus may be automated. In other instances, purification may be a stand-alone procedure to which the reaction product comprising the silicon glycan is subjected.

In particular embodiments, isolating the silicon glycan comprises altering the solubility profile of the diluent, e.g. by adding additional organic solvent (e.g. acetone) thereto, to partition and/or phase separate the reaction product. In these or other embodiments, isolating the silicon glycan comprises filtering away other components of the reaction product (i.e., where the silicon glycan is present in the residue/solids. In these or other embodiments, isolating the silicon glycan comprises washing away other components of the reaction product from the silicon glycan (e.g. with organic and/or aqueous solvents). In certain embodiments, isolating the silicon glycan comprises stripping solvents and/or other volatile components therefrom, which encompasses drying the silicon glycan (e.g. when water is being removed).

As will be understood in view of the Examples herein, the silicon glycan may be used in an industrial composition, such as in a drilling fluid, to modify the rheology thereof.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

X-Ray Fluorescence (XRF):

All samples are analyzed using a Rigaku Primus I Wavelength Dispersive X-ray Fluorescence (WDXRF) spectrometer (the "XRF instrument").

Full Scan—Relative Abundance

The XRF instrument is equipped with 4 kW max Rh target X-ray source with primary beam filters: Ni400 for Rh K-line overlaps (Ru, Rh, Pd, Ag, Cd, In, and Sn K-lines), A125 for Rh L-line overlaps (Ru, Rh, Pd, Ag, Cd, In, and Sn L-lines), and Be30 for X-ray tube protection of delicate samples. Analyzing crystals include LiF200 (K-U), PET (Al—Si), Ge (P—Cl), RX25 (F—Mg), RX35 (O), RX45 (N), RX61F (C), and RX75 (B). The detectors include a scintillation counter (SC) for Ti—U and a gas (flow) proportional counter for B—Ca.

Unless otherwise specified, samples are loaded into sample cups containing a 6 μm polypropylene thin-film window, and are analyzed using a 30 mm sample mask in a helium environment. The relative abundance of each element detected in the samples is calculated against a 1-point calibration with the matrix compound identified. The film impurities, as identified by the manufacturer, include: Al, P, Ca, Ti, Fe, Cu, Zn, and Zr. The samples are analyzed in vacuum using a 30 mm sample mask and the conditions described above.

Attenuated Total Reflectance infrared (ATR-IR):

All samples are analyzed using a Thermo Scientific Nicolet 6700 Fourier-transform infrared (FTIR) spectrometer.

Samples are examined by IR spectroscopy (using 64 scans at 4 cm$^{-1}$ resolution) using a single bounce Attenuated Total Reflectance attachment equipped with a diamond crystal. Depth of penetration during the surface analysis is estimated to be 2 microns near 1000 cm$^{-1}$.

Nuclear Magnetic Resonance (NMR)

All samples are analyzed using an Agilent 400 MHz NMR spectrometer.

Each sample (10 mg) is dissolved in 0.6 mL of D$_2$O and the mixture is stirred vigorously before being transferred to an NMR tube for analysis ($^1$H NMR). The acquisition parameters are summarized in Table 1 below.

TABLE 1

$^1$H NMR Parameters

| Parameter | Value |
| --- | --- |
| Solvent | D$_2$O |
| Temperature | ° C. |
| Number of Scans | 32 |
| Receiver Gain | 24 |
| Relaxation Delay | 1.5 |
| Pulse Width | 7.7 |
| Acquisition Time | 5 |
| Spectrometer Frequency | 399.8 |
| Spectral Width | 6410.3 |
| Lowest Frequency | −1346.7 |
| Nucleus | $^1$H |
| Acquired Size | 32051 |
| Spectral Size | 65536 |

Rheology

The rheological measurements are performed using a TA Instruments DHR-3 rheometer equipped with a cup and bob sensor, using a 40 mm cone and plate at 25° C.

Each sample (0.2 g) is dissolved in H$_2$O (9.8 g) to give a 2% solution, which is stirred at 70° C. for 18 h then left to cool down naturally. If the sample is insoluble in the H$_2$O, it is heated to 85° C. for several hours. If the sample remains insoluble, acetic acid (1 equiv.) is added to the solution, which is then allowed to stand for 24 h.

The solution is then sheared (ultrasound sonicator; 100 W power for 60 seconds). The sample is pre-sheared (40 seconds at a shear rate of 1 s$^{-1}$) and the viscosity measured at 1 second intervals over 40 seconds. The viscosity is reported in mPa·s as the average value for all data points measured at a shear rate of 6.31 s$^{-1}$.

Preparation Example 1: General Aminoethyl Polysaccharide Preparation (N-Methylaminoethyl-Modified Hydroxyethyl Cellulose (HEC))

Preparation

A 1000 mL, four-necked, round-bottomed flask is fitted with a stirring paddle and motor, a rubber serum cap, a nitrogen inlet, and a Claisen adaptor. The Claisen adaptor is fitted with a subsurface thermocouple connected to a J-KEM controller, and a Friedrich condenser connected to a mineral oil bubbler. The flask is charged with a hydroxyl-functional polysaccharide (56.75 g of CELLOSIZE™ HEC EP-300 from Dow Chemical Company, Midland MI; 50.23 g HEC content, 0.2009 moles, DS 2.0), an aziridinium halide precursor (N-methylaminoethyl chloride hydrochloride; 31.68 g, 0.2437 moles), and a mixture of isopropyl alcohol (IPA) (280.4 g) and deionized water (32.4 g) to form a slurry. The slurry is stirred (stirring motor set to 70 rpm) for one hour while purging with nitrogen (~1 bubble per second) to remove entrained oxygen.

A base (50% aqueous sodium hydroxide; 19.01 g, 0.2376 moles) is added to the stirring slurry dropwise (via plastic syringe) under nitrogen over one minute. The slurry is stirred for 5 minutes, then heated to and held at 80° C. (via heating mantle connected to the J-KEM controller set to 80° C.) for four hours. The heating mantle is then removed and the slurry is cooled in a cold water bath while maintaining a positive nitrogen pressure in the flask. When at ambient temperature, the slurry is neutralized by adding acid (glacial acetic acid; 6.0 g) to give a reaction mixture comprising the aminoethyl polysaccharide.

The aminoethyl polysaccharide is isolated from the reaction mixture as solids via vacuum filtration through a Buchner funnel (metal, coarse fritted) then washed in the Buchner funnel with the following wash liquors: once with a mixture of acetone (600 g) and deionized water (200 g); three times with a mixture of acetone (600 g) and deionized water (160 g); once with a mixture of acetone (600 g) and deionized water (80 g); and twice with pure acetone (600 g). The aminoethyl polysaccharide is then dried overnight in vacuo at 50° C., to give the isolated and dried aminoethyl polysaccharide (N-methylaminoethyl-modified hydroxyethyl cellulose) as an off-white powder (53.34 g).

Analysis

The aminoethyl polysaccharide is manually ground (mortar and pestle), screened (#30 US standard sieve), and analyzed according to the procedures set forth above to give the following results:

Volatiles Content: 1.15%.

Ash Content: 3.68% (as sodium chloride).

Kjeldahl Nitrogen Content: 0.663%, corresponding to a degree of N-methylaminoethyl substitution of 0.123.

The 2.0% Solution Viscosity: 337 mPa·s at a shear rate of 6.31 s$^{-1}$ (25.0° C.; corrected for volatiles and ash).

Preparation Examples 2-6: Neutralized Aminoethyl Polysaccharides (Aminoethyl- and N-Methylaminoethyl-Modified Hydroxyethyl Celluloses)

Aminoethyl Polysaccharide Preparation

Five aminoethyl polysaccharide HCl salts (Preparation Examples 2-6) are prepared according to the procedure of Preparation Example 1 above, using various aziridinium halide precursor, as set forth in Table 2 below.

TABLE 2

Aminoethyl Polysaccharide HCl Salts of Preparation Examples 2-6

| Preparation Example | Aziridinium Halide Precusor | DS (g/mol) |
|---|---|---|
| Prep. Ex. 2 | Aminoethyl chloride *HCl | 0.172 (263.9) |
| Prep. Ex. 3 | Aminoethyl chloride *HCl | 0.331 (276.7) |
| Prep. Ex. 4 | Aminoethyl chloride *HCl | 0.460 (287.0) |
| Prep. Ex. 5 | N-methylaminoethyl chloride *HCl | 0.416 (289.76) |
| Prep. Ex. 6 | N-methylaminoethyl chloride *HCl | 0.123 (261.75) |

Each of the aminoethyl polysaccharide HCl salts of Preparation Examples 2-6 is then subjected to the neutralization procedure below to prepare five neutralized aminoethyl polysaccharides (AP1-AP5).

Neutralization

The aminoethyl polysaccharide HCl salt is suspended in an 80:20 IPA/H$_2$O mixture (200 g) in a three neck flask equipped with a reflux condenser and a nitrogen inlet. The mixture is flushed with nitrogen gas for one hour. A NaOH solution (50 wt. % in water; 1 equiv. based on Kjeldahl nitrogen value) is then added at once. The solution mixture is heated to and held at 70° C. for 4 hours, then left to cool down naturally. The reaction mixture is vigorously stirring at room temperature for 18 hours.

The solution is filtered (Buchner funnel with Whatman® #44 filter paper), and the solids taken-up and placed back in the three neck flask and further stirred with an 80:20 IPA/H$_2$O mixture (200 mL) for 1-4 hours. The solids are then filtered once again (Buchner funnel with Whatman® #44 filter paper), then rinsed with an 80:20 IPA/H$_2$O mixture (200 mL), then a 90:10 IPA/H$_2$O mixture (200 mL), then pure IPA (200 mL). The solids are then left to dry naturally in a fume hood for 72 hours, followed by further drying in a vacuum oven for 4 hours at 50° C. The solids are finely ground (mortar and pestle) to give a neutralized aminoethyl polysaccharide as a powder.

Table 3 below sets forth certain parameters utilized in the neutralization of the aminoethyl polysaccharide HCl salts of Preparation Examples 2-6 to prepare the neutralized aminoethyl polysaccharides (AP) 1-5.

TABLE 3

Aminoethyl Polysaccharides of Preparation Examples 2-6

| Preparation Example | AP | Mass | Mol (mol N) | NaOH (g) | Yield (g) | DS (g/mol) |
|---|---|---|---|---|---|---|
| Prep. Ex. 2 | 1 | 50 g | 0.190 (0.033) | 2.6 | 44 | 0.172 (257.58) |
| Prep. Ex. 3 | 2 | 50 g | 0.181 (0.060) | 4.8 | 45 | 0.331 (264.59) |
| Prep. Ex. 4 | 3 | 50 g | 0.174 (0.080) | 6.4 | 46 | 0.460 (270.28) |
| Prep. Ex. 5 | 4 | 18.5 g | 0.064 (0.027) | 5.1 | 16 | 0.416 (274.59) |
| Prep. Ex. 6 | 5 | 35.0 g | 0.13 (0.017) | 3.0 | 32 | 0.123 (257.27) |

Examples 1-61 and Comparative Example 1: Silicon Glycan Preparation (Silicone Modified Hydroxyethyl Cellulose)

Preparation

An aminoethyl polysaccharide (neutralized) is weighed out in a 20 mL scintillation vial equipped with a magnetic stir bar. An epoxide-functional organosilicon compound having a siloxane degree of polymerization (DP) (i.e., a number of silicon centers per molecule) is added at once and the reaction mixture suspended in a multicomponent diluent (IPA/H$_2$O) The vial is placed in a heating block at 70° C. and stirred for a reaction time (T). The reaction mixture is cooled to room temperature naturally, and charged with acetone (10 mL) to give a reaction product comprising a silicon glycan.

The silicon glycan is isolated from the reaction product as solids via filtration (Buchner funnel using Whatman® #44 filter paper) then washed in the Buchner funnel with the following wash liquors: toluene (20 mL); an 80:20 IPA/H$_2$O mixture (20 mL); a 90:10 IPA/H$_2$O mixture (20 mL); IPA (20 mL); toluene (20 mL); and acetone (2×20 mL). The silicon glycan is then left to dry on the Buchner funnel for 5 minutes, collected into a tared glass vial, and dried for 4 hours in a vacuum oven at 55° C. to give the isolated and dried silicon glycan.

Analysis

Silicon incorporation is confirmed by NMR, and the silicon glycan analyzed via ATR-IR and XRF according to the procedures set forth above.

The degree of silicone substitution (Si-DS) is calculated using an analogous method to the method typically employed to determine amino-DS based on Kjedhal nitrogen values, which is readily understood by those of skill in the art. More specifically, the Si-DS is calculated according to the following formula (I), assuming that all amino-functionalities are neutral and that all silicon content is grafted on the cellulose backbone.

$$Si\text{-}DS = \frac{[(162 + EOMS \times 44) + (Amino\text{-}DS \times Amino\ chain\ MW)] \times \%\ Si}{(28.09 \times 100 \times \#\ Si) - MW\ siloxane\ chain \times \%\ Si} \quad \text{Formula (I)}$$

In formula (I) above, % Si refers to the value determined by XRF as described above, and #Si refers to the number of silicon atoms in the epoxide-functional organosilicon compound.

Tables 4-14 below set forth the parameters and results of Examples 1-61 and Comparative Example 1.

TABLE 4

| Examples 1-6 | | | | | | |
|---|---|---|---|---|---|---|
| Example: | Ex. 1 | Ex. 2 | Ex. 3 | Ex. 4 | Ex. 5 | Ex. 6 |
| Silicon Compound DP: | 3 | 3 | 3 | 3 | 3 | 3 |
| Silicon Compound (g): | 1.06 | 1.06 | 1.06 | 1.06 | 1.06 | 1.06 |
| AP: | 1 | 1 | 1 | 1 | 1 | 1 |
| Amount AP (g): | 1 | 1 | 1 | 1 | 1 | 1 |
| IPA/$H_2$O: | 85/15 | 80/20 | 0/100 | 90/10 | 90/10 | 90/10 |
| Amount Diluent (g): | 10 | 10 | 1 | 10 | 10 | 10 |
| Time (T) (hours): | 60 | 60 | 60 | 5 | 21 | 29 |
| Yield (mg): | 1129 | 1090 | 1114 | 908 | 960 | 978 |
| Wt. % Si: | 2.46 | 2.6 | 1.25 | 0.27 | 1.04 | 1.7 |
| Si-DS: | 0.083 | 0.088 | 0.04 | 0.008 | 0.033 | 0.056 |

TABLE 5

| Examples 7-12 | | | | | | |
|---|---|---|---|---|---|---|
| Example: | Ex. 7 | Ex. 8 | Ex. 9 | Ex. 10 | Ex. 11 | Ex. 12 |
| Silicon Compound DP: | 3 | 3 | 13 | 13 | 23 | 23 |
| Silicon Compound (g): | 1.06 | 1.06 | 2.7 | 3.9 | 1.5 | 2.7 |
| AP: | 1 | 1 | 1 | 1 | 1 | 1 |
| Amount AP (g): | 1 | 1 | 1 | 1 | 1 | 1 |
| IPA/$H_2$O: | 90/10 | 90/10 | 85/15 | 85/15 | 85/15 | 85/15 |
| Amount Diluent (g): | 10 | 10 | 10 | 10 | 10 | 10 |
| Time (T) (hours): | 53 | 92 | 90 | 90 | 90 | 90 |
| Yield (mg): | 926 | 1080 | 916 | 1004 | 913 | 883 |
| Wt. % Si: | 2.69 | 3.49 | 1.83 | 2 | 0.49 | 0.62 |
| Si-DS: | 0.091 | 0.122 | 0.014 | 0.015 | 0.002 | 0.0025 |

TABLE 6

| Examples 13-18 | | | | | | |
|---|---|---|---|---|---|---|
| Example | Ex. 13 | Ex. 14 | Ex. 15 | Ex. 16 | Ex. 17 | Ex. 18 |
| Silicon Compound DP | 23 | 43 | 43 | 43 | 3 | 3 |
| Silicon Compound (g) | 3.9 | 1.35 | 2.7 | 3.9 | 1.03 | 1.03 |
| AP: | 1 | 1 | 1 | 1 | 4 | 4 |
| Amount AP (g): | 1 | 1 | 1 | 1 | 1 | 1 |
| IPA/$H_2$O: | 85/15 | 85/15 | 85/15 | 85/15 | 90/10 | 90/10 |
| Amount Diluent (g): | 10 | 10 | 10 | 10 | 5 | 5 |
| Time (T) (hours): | 90 | 90 | 90 | 90 | 24 | 24 |
| Yield (mg): | 696 | 446 | 844 | 891 | 845 | 1225 |
| Wt. % Si: | 0.75 | 0.25 | 0.34 | 0.38 | 4.16 | 4.17 |
| Si-DS: | 0.003 | 0.0005 | 0.0007 | 0.0008 | 0.16 | 0.16 |

TABLE 7

| Examples 19-24 | | | | | | |
|---|---|---|---|---|---|---|
| Example | Ex. 19 | Ex. 20 | Ex. 21 | Ex. 22 | Ex. 23 | Ex. 24 |
| Silicon Compound DP | 3 | 3 | 3 | 3 | 3 | 3 |
| Silicon Compound (g) | 1.03 | 1.03 | 1.03 | 1.03 | 1.03 | 1.03 |
| AP: | 4 | 5 | 5 | 5 | 4 | 4 |
| Amount AP (g): | 1 | 1 | 1 | 1 | 1 | 1 |
| IPA/$H_2$O: | 90/10 | 90/10 | 90/10 | 90/10 | 90/10 | 90/10 |
| Amount Diluent (g): | 10 | 5 | 5 | 10 | 5 | 5 |
| Time (T) (hours): | 48 | 24 | 24 | 48 | 4 | 8 |
| Yield (mg): | 1151 | 1130 | 847 | 1150 | 1123 | 1109 |
| Wt. % Si: | 3.83 | 3.03 | 3.43 | 2.84 | 2.45 | 3.32 |
| Si-DS: | 0.15 | 0.11 | 0.12 | 0.1 | 0.09 | 0.12 |

TABLE 8

Examples 25-30

| Example | Ex. 25 | Ex. 26 | Ex. 27 | Ex. 28 | Ex. 29 | Ex. 30 |
|---|---|---|---|---|---|---|
| Silicon Compound DP | 3 | 3 | 3 | 3 | 3 | 3 |
| Silicon Compound (g) | 0.55 | 0.55 | 1.03 | 1.03 | 0.55 | 0.51 |
| AP: | 4 | 4 | 5 | 5 | 5 | 5 |
| Amount AP (g): | 1 | 1 | 1 | 1 | 1 | 1 |
| IPA/$H_2O$: | 90/10 | 90/10 | 90/10 | 90/10 | 90/10 | 90/10 |
| Amount Diluent (g): | 5 | 5 | 5 | 5 | 5 | 5 |
| Time (T) (hours): | 4 | 8 | 4 | 8 | 24 | 4 |
| Yield (mg): | 1003 | 1060 | 966 | 989 | 1139 | 959 |
| Wt. % Si: | 1.80 | 2.34 | 0.6 | 1.17 | 2.82 | 0.45 |
| Si-DS: | 0.06 | 0.08 | 0.019 | 0.04 | 0.1 | 0.014 |

TABLE 9

Examples 31-36

| Example | Ex. 31 | Ex. 32 | Ex. 33 | Ex. 34 | Ex. 35 | Ex. 36 |
|---|---|---|---|---|---|---|
| Silicon Compound DP | 3 | 3 | 3 | 3 | 3 | 3 |
| Silicon Compound (g) | 0.51 | 0.51 | 0.21 | 0.34 | 0.098 | 0.196 |
| AP: | 5 | 5 | 5 | 5 | 5 | 5 |
| Amount AP (g): | 1 | 1 | 1 | 1 | 1.5 | 1.5 |
| IPA/$H_2O$: | 90/10 | 90/10 | 90/10 | 90/10 | 90/10 | 90/10 |
| Amount Diluent (g): | 5 | 5 | 5 | 5 | 7 | 7 |
| Time (T) (hours): | 8 | 24 | 8 | 24 | 8 | 8 |
| Yield (mg): | 1017 | 1039 | 965 | 1021 | 965 | 987 |
| Wt. % Si: | 0.91 | 1.95 | 0.56 | 1.34 | 0.21 | 0.33 |
| Si-DS: | 0.029 | 0.065 | 0.018 | 0.043 | 0.0066 | 0.0103 |

TABLE 10

Examples 37-42

| Example | Ex. 37 | Ex. 38 | Ex. 39 | Ex. 40 | Ex. 41 | Ex. 42 |
|---|---|---|---|---|---|---|
| Silicon Compound DP | 3 | 3 | 3 | 3 | 3 | 3 |
| Silicon Compound (g) | 0.294 | 0.392 | 0.49 | 0.588 | 0.686 | 0.784 |
| AP: | 5 | 5 | 5 | 5 | 5 | 5 |
| Amount AP (g): | 1.5 | 1.5 | 1.5 | 1.5 | 1.5 | 1.5 |
| IPA/$H_2O$: | 90/10 | 90/10 | 90/10 | 90/10 | 90/10 | 90/10 |
| Amount Diluent (g): | 7 | 7 | 7 | 7 | 7 | 7 |
| Time (T) (hours): | 8 | 8 | 8 | 8 | 8 | 8 |
| Yield (mg): | 897 | 1003 | 1012 | 1031 | 1139 | 959 |
| Wt. % Si: | 0.46 | 0.5 | 0.62 | 0.7 | 0.69 | 0.72 |
| Si-DS: | 0.0144 | 0.0154 | 0.0195 | 0.0219 | 0.021 | 0.023 |

TABLE 11

Examples 43-48

| Example | Ex. 43 | Ex. 44 | Ex. 45 | Ex. 46 | Ex. 47 | Ex. 48 |
|---|---|---|---|---|---|---|
| Silicon Compound DP | 3 | 3 | 3 | 3 | 13 | 13 |
| Silicon Compound (g) | 0.882 | 0.98 | 1.076 | 1.174 | 1.03 | 1.03 |
| AP: | 5 | 5 | 5 | 5 | 4 | 4 |
| Amount AP (g): | 1.5 | 1.5 | 1.5 | 1.5 | 1.5 | 1.5 |
| IPA/$H_2O$: | 90/10 | 90/10 | 90/10 | 90/10 | 90/10 | 90/10 |
| Amount Diluent (g): | 7 | 7 | 7 | 7 | 7 | 7 |
| Time (T) (hours): | 8 | 8 | 8 | 8 | 24 | 24 |
| Yield (mg): | 1017 | 1039 | 965 | 1021 | 1040 | 983 |
| Wt. % Si: | 0.8 | 0.82 | 0.92 | 0.88 | 3.0215 | 2.6397 |
| Si-DS: | 0.025 | 0.026 | 0.029 | 0.028 | 0.025 | 0.022 |

TABLE 12

Examples 49-54

| Example | Ex. 49 | Ex. 50 | Ex. 51 | Ex. 52 | Ex. 53 | Ex. 54 |
|---|---|---|---|---|---|---|
| Silicon Compound DP | 13 | 3 | 3 | 3 | 3 | 3 |
| Silicon Compound (g) | 1.03 | 1.667 | 0.833 | 1.621 | 0.811 | 1.587 |
| AP: | 4 | 1 | 1 | 2 | 2 | 3 |
| Amount AP (g): | 1.5 | 1.5 | 1.5 | 1.5 | 1.5 | 1.5 |
| IPA/$H_2O$: | 90/10 | 90/10 | 90/10 | 90/10 | 90/10 | 90/10 |
| Amount Diluent (g): | 3.6 | 7 | 7 | 7 | 7 | 7 |
| Time (T) (hours): | 24 | 24 | 24 | 24 | 24 | 24 |
| Yield (mg): | 1040 | 1462 | 1447 | 1498 | 1534 | 1563 |
| Wt. % Si: | 2.1908 | 0.66 | 0.67 | 1.67 | 1.36 | 2.99 |
| Si-DS: | 0.018 | 0.021 | 0.021 | 0.056 | 0.045 | 0.109 |

TABLE 13

Examples 55-60

| Example | Ex. 55 | Ex. 56 | Ex. 57 | Ex. 58 | Ex. 59 | Ex. 60 |
|---|---|---|---|---|---|---|
| Silicon Compound DP | 3 | 13 | 13 | 13 | 13 | 13 |
| Silicon Compound (g) | 0.794 | 1.26 | 0.63 | 1.223 | 0.661 | 1.196 |
| AP: | 3 | 1 | 1 | 2 | 2 | 3 |
| Amount AP (g): | 1.5 | 1.5 | 1.5 | 1.5 | 1.5 | 1.5 |
| IPA/$H_2O$: | 90/10 | 90/10 | 90/10 | 90/10 | 90/10 | 90/10 |
| Amount Diluent (g): | 7 | 7 | 7 | 7 | 7 | 7 |
| Time (T) (hours): | 24 | 24 | 24 | 24 | 24 | 24 |
| Yield (mg): | 1467 | 1437 | 1412 | 1465 | 1497 | 1432 |
| Wt. % Si: | 2 | 0.1697 | 0.1367 | 0.3844 | 0.272 | 0.9299 |
| Si-DS: | 0.07 | 0.001 | 0.001 | 0.003 | 0.002 | 0.007 |

TABLE 14

Example 61 and Comparative Example 1

| Example | Ex. 61 | Comp. Ex. 1 |
|---|---|---|
| Silicon Compound DP | 13 | 3 |
| Silicon Compound (g) | 0.598 | 1.06 |
| AP: | 3 | 1 |
| Amount AP (g): | 1.5 | 1 |
| IPA/$H_2O$: | 90/10 | 90/10 |
| Amount Diluent (g): | 7 | 10 |
| Time (T) (hours): | 24 | 92 |
| Yield (mg): | 1452 | 846 |
| Wt. % Si: | 0.5663 | 0.03 |
| Si-DS: | 0.004 | 0 |

In Comparative Example 1, the organosilicon compound is not epoxide functional.

The 2% solution viscosity (in water) of particular samples is taken at a constant shear rate of 6.31 s$^{-1}$ according to the procedure above, and set forth in Table 15 below.

TABLE 15

2% Solution Viscosity

| Sample | Viscosity (mPa·s) | Si Content (wt. %) |
|---|---|---|
| AP 5 | 203 | 0 |
| Example 35 | 45 | 0.215 |
| Example 36 | 324 | 0.332 |
| Example 37 | 304 | 0.463 |
| Example 38 | 410 | 0.496 |
| Example 39 | 1908 | 0.623 |
| Example 40 | 1949 | 0.7 |
| Example 41 | 674 | 0.693 |
| Example 42 | 4813 | 0.716 |
| Example 43 | 5509 | 0.797 |
| Example 44 | 12273 | 0.815 |

The invention has been described in an illustrative manner, and it is to be understood that the terminology which has been used is intended to be in the nature of words of description rather than of limitation. Many modifications and variations of the present invention are possible in light of the above teachings. The invention may be practiced otherwise than as specifically described.

The invention claimed is:

1. A silicon glycan having the formula:

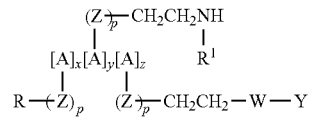

where each A is an independently selected saccharide moiety; each W is an independently selected beta-amino alcohol moiety; each Y is an independently selected organosilicon moiety; each R is independently selected from substituted or unsubstituted hydrocarbyl groups, ether moieties, amine moieties, and H; each $R^1$ is independently selected from substituted or unsubstituted hydrocarbyl groups and H; each Z is an independently selected moiety having the formula —$(C_tH_{2t}O)_u$—, where subscript t is independently selected from 2 to 4 in each moiety indicated by subscript u and subscript u is from 1 to 50; each subscript p is independently 0 or 1; subscripts x and y are each independently from ≥0 to <1; subscript z is from >0 to 1, with the proviso that x+y+z=1; and moieties indicated by subscripts x, y, and z may be in randomized or block form in the silicon glycan.

2. The silicon glycan of claim 1, wherein: (i) each saccharide moiety A is a hexose; (ii) each $R^1$ is H or a $C_1$-$C_4$ hydrocarbyl group; (iii) subscript p is 1 in each moiety indicated by subscript y; (iv) subscript p is 1 in each moiety indicated by subscript z; (v) each R is H, a $C_1$-$C_{18}$ hydrocarbyl group, a polyoxyalkylene group, or a tertiary amino group; or (vi) any combination of (i) to (v).

3. The silicon glycan of claim 1, wherein each saccharide moiety A is a component of and collectively form a hydroxyethyl cellulose, a carboxymethyl cellulose, an ethyl hydroxyethyl cellulose, a hydroxyethyl methyl cellulose, a hydroxypropyl methyl cellulose, a methyl cellulose, an ethyl cellulose, or a combination thereof.

4. The silicon glycan of claim 1, wherein each beta-amino alcohol moiety W is independently of formula (i)-(iv):

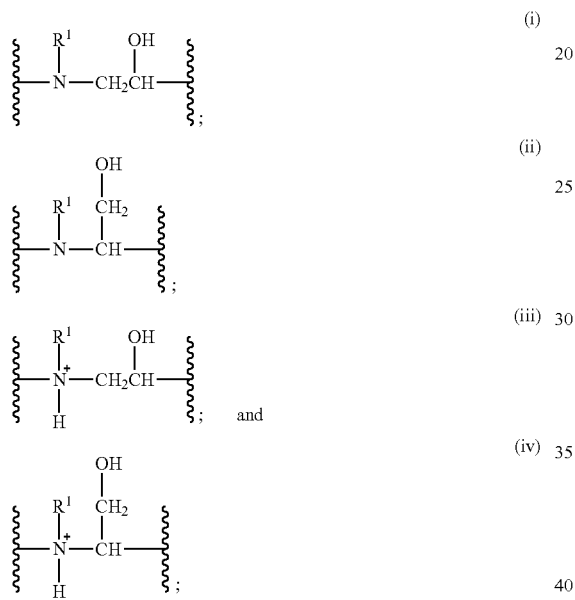

where each $R^1$ is independently selected and as defined above.

5. The silicon glycan of claim 1, wherein each organosilicon moiety Y is independently selected from a silyl moiety and an organopolysiloxane.

6. The silicon glycan of claim 5, wherein at least one organosilicon moiety Y is the silyl moiety; and wherein the silyl moiety has the formula:

where $D^1$ is a divalent linking group; and each $R^2$ is independently selected from substituted or unsubstituted hydrocarbyl groups, siloxy groups, silyl groups, H, and alkylene oxide groups.

7. The silicon glycan of claim 5, wherein at least one organosilicon moiety Y is the organopolysiloxane; and wherein the organopolysiloxane has the formula:

$$[R^3{}_3SiO_{1/2}]_a[R^3{}_2SiO_{2/2}]_b[R^3SiO_{3/2}]_c[SiO_{4/2}]_d,$$

where each $R^3$ is independently selected from substituted or unsubstituted hydrocarbyl groups and siloxy groups, with the proviso that at least one $R^3$ is a silicon-bonded divalent linking group bonded to one of the beta-amino alcohol moieties W; and subscripts a, b, c, and d are each mole fractions such that a+b+c+d=1, with the proviso that a+b+c>0.

8. A method of preparing a silicon glycan, said method comprising:

reacting (A) an aminoethyl polysaccharide and (B) an epoxide-functional organosilicon compound, to give the silicon glycan;

wherein the silicon glycan is the silicon glycan of claim 1.

9. The method of claim 8, wherein the aminoethyl polysaccharide (A) has the formula:

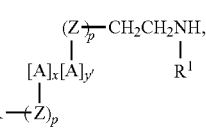

where each A is an independently selected saccharide moiety; each R is independently selected from substituted or unsubstituted hydrocarbyl groups, ether moieties, amine moieties, and H;

each $R^1$ is independently selected from substituted or unsubstituted hydrocarbyl groups and H;

each Z is an independently selected moiety having the formula $-(C_tH_{2t}O)_u-$, where subscript t is independently selected from 2 to 4 in each moiety indicated by subscript u and subscript u is from 1 to 50; each subscript p is independently 0 or 1; subscript x is from ≥0 to <1; subscript y' is from >0 to 1, with the proviso that x+y=1; and moieties indicated by subscripts x and y' may be in randomized or block form in the aminoethyl polysaccharide (A).

10. The method of claim 9, wherein: (i) the saccharide in each moiety A is a hexose; (ii) each $R^1$ is H or a $C_1$-$C_4$ hydrocarbyl group; (iii) subscript p is 1 in each moiety indicated by subscript y; (iv) each R is H, a $C_1$-$C_{18}$ hydrocarbyl group, a polyoxyalkylene group, or a tertiary amino group; or (vi) any combination of (i) to (v).

11. The method of claim 8, wherein the aminoethyl polysaccharide (A) comprises an aminoethyl-functional hydroxyethyl-glucose moiety having the formula:

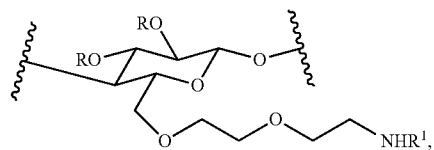

where each R is independently selected from substituted or unsubstituted hydrocarbyl groups, ether moieties, amine moieties, and H; and $R^1$ is an independently selected substituted or unsubstituted hydrocarbyl group or H.

12. The method of claim 8, wherein the epoxide-functional organosilicon compound (B) has the formula:

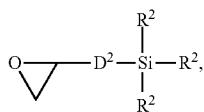

where $D^2$ is a divalent linking group; and each $R^2$ is independently selected from substituted or unsubstituted hydrocarbyl groups and siloxy groups.

13. The method of claim 8, wherein the epoxide-functional organosilicon compound (B) has the formula:

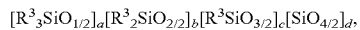

where each $R^3$ is independently selected from substituted or unsubstituted hydrocarbyl groups, siloxy groups, and epoxide-functional groups, with the proviso that at least one $R^3$ comprises an epoxide-functional group; and subscripts a, b, c, and d are each mole fractions such that $a+b+c+d=1$, with the proviso that $a+b+c>0$.

14. The method of claim 8, further comprising preparing the aminoethyl polysaccharide (A) by reacting (A1) a hydroxyl-functional polysaccharide and (A2) an aziridinium halide compound to give the aminoethyl polysaccharide (A).

15. The method of claim 14, wherein the aziridinium halide compound (A2) has the general formula:

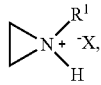

where $R^1$ is independently selected from substituted or unsubstituted hydrocarbyl groups and H; and $^-X$ is chloride or bromide.

16. The method of claim 8, wherein the aminoethyl polysaccharide (A) and the epoxide-functional organosilicon compound (B) are reacted under a heterogeneous condition.

17. The method of claim 16, wherein the heterogeneous condition comprises: (i) a biphasic reaction system; (ii) a multicomponent diluent; or (iii) both (i) and (ii).

18. The method of claim 8, wherein reacting the aminoethyl polysaccharide (A) and the epoxide-functional organosilicon compound (B) forms a reaction product comprising the silicon glycan; and wherein the method further comprises isolating the silicon glycan from the reaction product.

* * * * *